US012597614B2

(12) United States Patent
Favors et al.

(10) Patent No.: US 12,597,614 B2
(45) Date of Patent: Apr. 7, 2026

(54) HYBRID ELECTRODES FOR BATTERY CELLS AND METHODS OF PRODUCTION THEREOF

(71) Applicant: NEXTECH BATTERIES, INC., Carson City, NV (US)

(72) Inventors: Zachary Favors, Reno, NV (US); Fabio Albano, Carson City, NV (US); Bill Burger, Carson City, NV (US)

( * ) Notice: Subject to any disclaimer, the term of this patent is extended or adjusted under 35 U.S.C. 154(b) by 710 days.

(21) Appl. No.: 17/642,731

(22) PCT Filed: Sep. 14, 2020

(86) PCT No.: PCT/US2020/050780
§ 371 (c)(1),
(2) Date: Mar. 14, 2022

(87) PCT Pub. No.: WO2021/051109
PCT Pub. Date: Mar. 18, 2021

(65) Prior Publication Data
US 2022/0328839 A1     Oct. 13, 2022

Related U.S. Application Data

(60) Provisional application No. 62/899,612, filed on Sep. 12, 2019, provisional application No. 62/899,569, filed on Sep. 12, 2019.

(51) Int. Cl.
*H01M 4/62* (2006.01)
*H01M 4/04* (2006.01)
(Continued)

(52) U.S. Cl.
CPC ......... *H01M 4/625* (2013.01); *H01M 4/0404* (2013.01); *H01M 4/133* (2013.01);
(Continued)

(58) Field of Classification Search
CPC ...... H01M 4/133; H01M 4/625; H01M 4/583; H01M 2004/8689
See application file for complete search history.

(56) References Cited

U.S. PATENT DOCUMENTS 9,246,149 B2 * 1/2016 Manthiram ......... H01M 10/052
9,876,223 B2 * 1/2018 Ryu .................... H01M 4/1397
(Continued)

FOREIGN PATENT DOCUMENTS

CN          104362290 A  * 2/2015  ............. B82Y 30/00
CN          107959045 A  * 4/2018  ............. B82Y 30/00
(Continued)

OTHER PUBLICATIONS

Antic et al., Comparison of oxidized carbon nanotubes for Li-ion storage capacity, Journal of Applied Electrochemistry, 45, 161-167, 2015. (Year: 2015).*
(Continued)

*Primary Examiner* — Amanda C. Walke
(74) *Attorney, Agent, or Firm* — Gutwein Law; Tyler B. Droste

(57) ABSTRACT

Carbon based electrodes for use in battery cells. The carbon-based electrodes can be a pure binderless carbon electrode. The electrode may further include a carbon nanotube-based interlayer comprising about 1-30% oxidized carbon nanotubes, wherein the interlayer can be configured to act as a secondary pathway to a current collector of a battery cell. Some of the formed cathodes can be used in battery cells including a lithium based anode and a separator formed between the cathode and anode. An electrolyte solution can be utilized to expose the cathode to an activated sulfur material.

4 Claims, 12 Drawing Sheets

5

3

7

(51) Int. Cl.

| | |
|---|---|
| *H01M 4/133* | (2010.01) |
| *H01M 10/0525* | (2010.01) |
| *H01M 10/0568* | (2010.01) |
| *H01M 10/0569* | (2010.01) |
| *H01M 4/02* | (2006.01) |

(52) U.S. Cl.
CPC ....... *H01M 4/623* (2013.01); *H01M 10/0525* (2013.01); *H01M 10/0568* (2013.01); *H01M 10/0569* (2013.01); *H01M 2004/028* (2013.01); *H01M 2300/0028* (2013.01)

(56) References Cited

U.S. PATENT DOCUMENTS

| | | | | |
|---|---|---|---|---|
| 2013/0089790 A1* | 4/2013 | Byon | ..................... | H01G 11/50 |
| | | | | 361/503 |
| 2013/0337347 A1* | 12/2013 | Pol | ........................ | H01M 4/583 |
| | | | | 568/18 |
| 2016/0240853 A1* | 8/2016 | Simmons | ................ | H01M 4/60 |
| 2020/0028178 A1* | 1/2020 | He | ........................ | H01M 10/36 |

FOREIGN PATENT DOCUMENTS

| | | | | | |
|---|---|---|---|---|---|
| CN | 107689449 B | * | 4/2020 | ........ | H01M 10/0525 |
| JP | 2022090728 A | * | 6/2022 | | |
| KR | 20180046188 A | * | 5/2018 | | |
| TW | 202013799 A | * | 4/2020 | ........... | C01B 32/166 |
| WO | WO-2011058417 A1 | * | 5/2011 | ........ | H01M 10/0525 |
| WO | WO-2014189549 A2 | * | 11/2014 | ............... | B21C 1/02 |
| WO | WO-2019018636 A1 | * | 1/2019 | .......... | H01M 10/052 |
| WO | WO-2021195450 A1 | * | 9/2021 | ........ | H01M 10/0525 |

OTHER PUBLICATIONS

Liu et al, "Reliable Interlayer Based on Hybrid Nanocomposites and Carbon Nanotubes for Lithium-Sulfur Batteries", Applied Materials and Interfaces, 11, 15607-15615 (2019). (Year: 2019).*

Cheng et al. "Oxidized multiwall carbon nanotube modified separator for high performance lithium-sulfur batteries with high sulfur loading", RSC Advances, 6, 89972 (2016). (Year: 2016).*

\* cited by examiner

HYBRID ELECTRODES FOR BATTERY CELLS AND METHODS OF PRODUCTION THEREOF

CROSS-REFERENCE TO RELATED APPLICATION

This patent application claims priority to U.S. Provisional Application 62/899,569 filed Sep. 12, 2019 and to U.S. Provisional Application 62/899,612 filed Sep. 12, 2019, the disclosure of which is considered part of the disclosure of this application and is hereby incorporated by reference in its entirety.

FIELD OF THE INVENTION

This invention relates generally to electrochemical cells and components therein. More specifically, the present invention relates to a cathode compositions and methods of production thereof, including hybrid cathode electrodes having a carbon interlayer for a lithium sulfur battery suitable for electric vehicle applications requiring repeating rapid charge and discharge in intermediate state of charge and industrial applications such as windmills and PV (photovoltaics), and grid storage.

BACKGROUND

Battery performance can be assessed in terms of both energy density and power density. The energy density of a battery is a measure of the amount of energy that the battery is capable of storing (e.g., per unit of the battery's volume or mass). A high energy battery is able to store a large amount of energy (e.g., relative to the battery's volume or mass) and is more desirable for applications that require longer run times (e.g., rechargeable or secondary batteries). Meanwhile, the power density of a battery indicates how fast a battery is able to accept and/or deliver energy (e.g., rate of energy transfer). Accordingly, a battery with high power density tends to charge and discharge quickly. Such a battery may be desirable in applications that produce and/or consume rapid bursts of energy (e.g., vehicular acceleration).

An optimal battery should be both high energy and high power. But despite having high energy density, conventional batteries (e.g., lithium (Li) ion) tend to have poor power density. This is because electrodes in conventional batteries often include material (e.g., graphitized carbon for lithium ion batteries) that limits charging speed.

Conventional cathode fabrication can additionally rely upon use of polymer binders to adhere active material to a metallic current collector. Herein, we describe the process of creating a pure carbon cathode using conventional electrode coating technology that results in a high conductivity (ionic and electrical), binder-free, lightweight carbon cathode structure. Currently the use of sulfur as a component of a battery electrode has a number of shortfalls including low electrical conductivity of sulfur active materials, low Power of sulfur electrode, low surface area of sulfur electrode, and sulfur dissolution and polysulfide shuttling effect.

Batteries are typically constructed of solid electrodes, separators, electrolyte, and ancillary components such as, for example, packaging, thermal management, cell balancing, current collectors, and/or other such components. The electrodes typically include active materials, conductive additives, binders and other additives.

Some known methods for preparing batteries include coating a metallic substrate (e.g., a current collector) with slurry composed of an active material, conductive additives, and a binding agent dissolved or dispersed in a solvent, evaporating the solvent, and calendering the dried electrode to a specified thickness. The electrodes are then cut with a die, packaged with other components, infiltrated with electrolyte and then sealed in a package.

Such known methods generally involve complicated and expensive manufacturing steps such as casting the electrode and are only suitable for electrodes of limited thickness, for example, less than 100 um (final single sided coated thickness). These known methods for producing electrodes of limited thickness result in batteries with lower capacity, lower energy density and a high ratio of inactive components to active materials. Furthermore, the binders used in known electrode formulations can increase tortuosity and decrease the ionic conductivity of the electrode.

To increase the active material to inactive material ratio, conventional electrochemical cells are generally formed by coating the electrode active material (i.e., the anode formulation slurry and the cathode formulation slurry) on both sides of a current collector. A separator is disposed between the electrodes, i.e. the anode and cathode, to form a conventional electrochemical cell. A plurality of such electrochemical cells can be stacked on top of each other, generally with a spacer disposed therebetween, to form an electrochemical cell stack. There exists a need for a electrodes and electrochemical cells with increased electrical conductivity of sulfur active materials, increased power potential of the sulfur electrode, increased surface area of the sulfur electrode, and that further minimize or inhibits the dissolution of sulfur and the polysulfide shuttling effect of current sulfur electrodes.

BRIEF SUMMARY OF THE INVENTION

In aspect, this disclosure is related to a method of manufacturing a carbon nanotube-based interlayer. Such interlayer is formed on the surface of the electrode thereof and could be deposited as a coating layer (i.e. interlayer) that can be made of a porous carbon with high surface area.

In another aspect, this disclosure is related a carbon nanotube-based interlayer comprising 1-30 wt. % oxidized carbon nanotubes (Ox-CNTs). The carbon interlayer has capacitor capacity and/or pseudo capacitor capacity attributes that can increase the power content of the battery cell.

In yet another aspect, this disclosure is related to a pure carbon, zero binder, roll-to-roll processable cathode structure for batteries and method of manufacture thereof.

In another aspect, this disclosure is related to a cathode structure and method of manufacturing thereof for lithium sulfur battery cells.

In another aspect, this disclosure is related to a cathode structure and method of manufacturing thereof for battery cells.

In another aspect, this disclosure is related to an extrusion method to form a 3D cathode structure with or without a binder. In some aspects the binder material for the extrusion process is a fibrous polymer, e.g. PTFE. In other aspects the binderless cathode is former by extruding or rolling carbon nano tubes (CNTs).

In yet another aspect, this disclosure is related to an electrochemical cell including a 3D positive electrode formed using a carbon material, including but not limited to carbon nanotubes or graphene nanoplatelets having high surface area and connected together to form a percolating 3D network with or without a binder. The positive carbon electrodes can further include extremely high sulfur loadings (mAh/cm2) as active material deposited after the cathode is formed or at the moment of manufacture. A negative electrode can be made of lithium metal or lithium alloys or any other anode material capable of matching the high capacity of the cathode. A separator can be disposed between the 3D positive electrode and the negative electrode. In some embodiments such separator system could be made of a solid-state electrolyte or comprise a solid-state electrolyte layer. At least one of the 3D positive electrode and the negative electrode can have a thickness of at least about 100 um.

In yet another aspect, the invention comprises the method of forming such cathode 3D microstructure with or without a binder and using one of the methods including but not limited to extrusion, lamination, roll pressing, die pressing, tape casting, slot die coating, any other method of forming a thick film. In yet another aspect, this invention is related to a cathode electrode comprising two kinds of carbon materials, a first carbon material such as conductive carbon black or graphene nano-platelets, and a second carbon material such as activated carbon or carbon-nanotubes, having capacitor capacity and/or pseudo capacitor capacity, with or without a binder. Such carbon electrodes can provide a porous carbon percolating network (e.g. a nano-graphene percolating network, or equivalent carbon network formed) with or without the use of a binder, and a sulfur active material filled in the pores or deposited on the electrode active surface area therein. The sulfur active material can contribute to the energy content of the cell. Formed on the surface of the electrode can be a coating layer (interlayer) made of a porous carbon with high surface area (e.g. a carbon-nanotubes interlayer), wherein such layer contributes to improved performance and to the power content of the cell.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1:
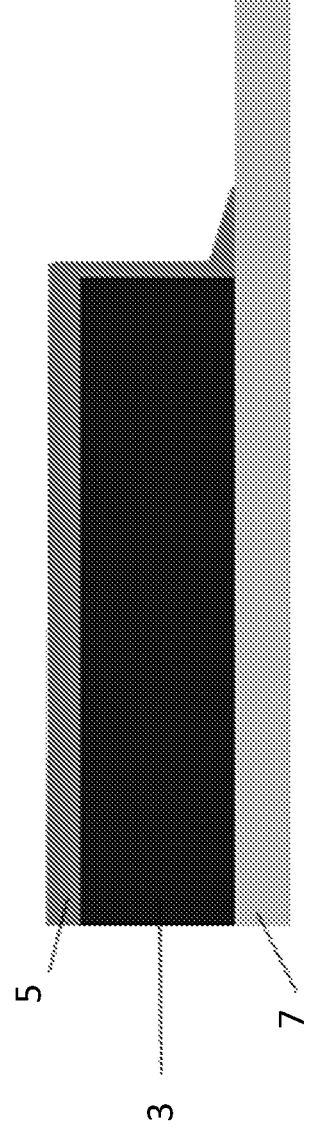
FIG. 1 is a side view illustration of an exemplary embodiment of a carbon interlayer of the present disclosure.

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention of this disclosure is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention. As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature. Similarly, coupled can refer to a two member or elements being in communicatively coupled, wherein the two elements may be electronically, through various means, such as a metallic wire, wireless network, optical fiber, or other medium and methods.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The present disclosure relates A battery cell having an anode, a cathode, an interlayer coated around the exterior of the cathode, and a separator positioned between the anode and the cathode. Similarly, the present disclosure provides a carbon nanotube-based interlayer composition comprising about 1-30 wt. % oxidized carbon nanotubes (Ox-CNTs) that can be coated onto the surface of a dried electrode, including but not limited to a cathode. The electrode can be coated using any suitable method, such as a doctor blade method. This layer can be termed the "interlayer" or "secondary current collector". The interlayer can be positioned between the cathode and separator 11 and can act as a secondary pathway to a current collector for shuttling electrons in and out of a cathode.

Figure 5:
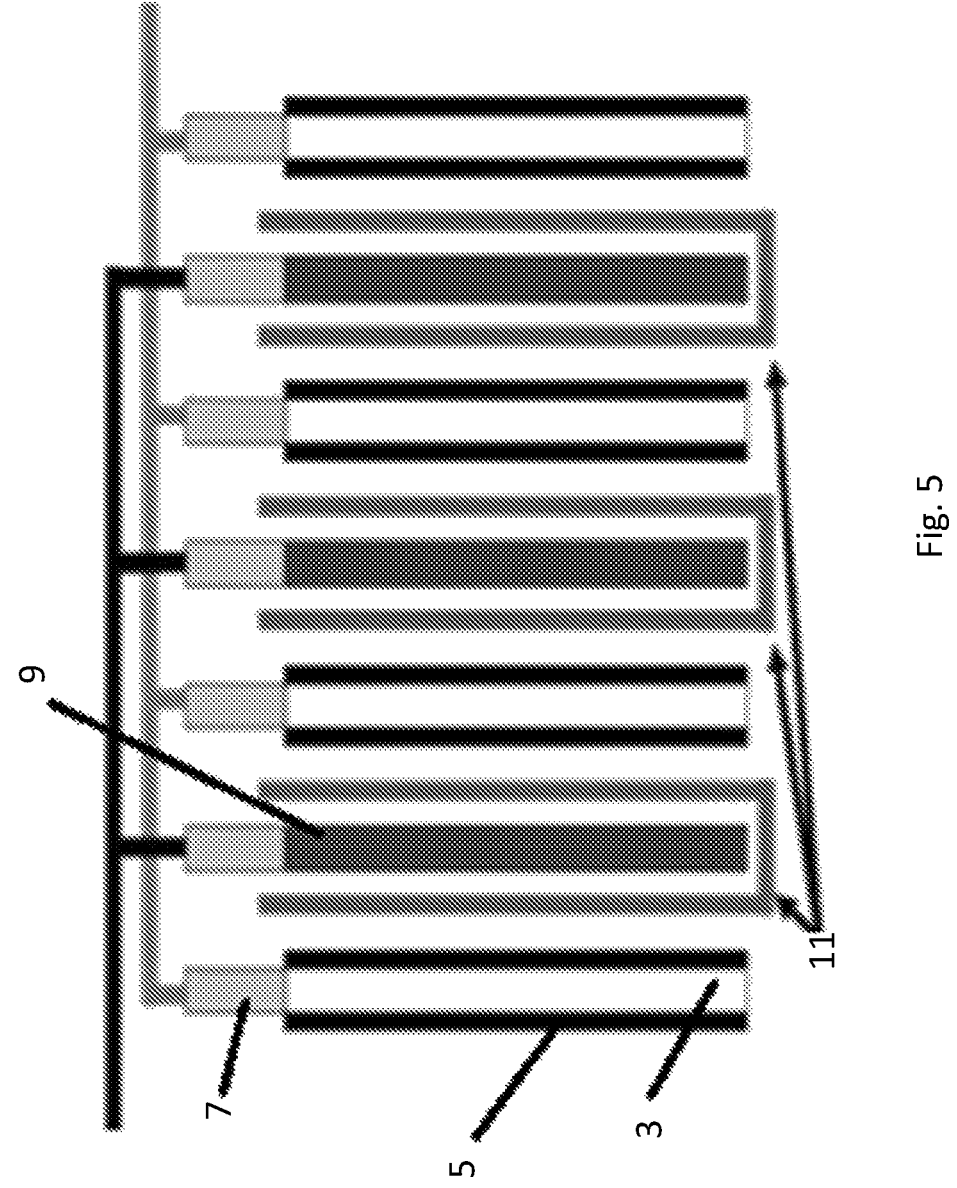
FIG. 5 is a cross-section illustration an exemplary embodiment of a battery cell of the present disclosure.
Figure 6:
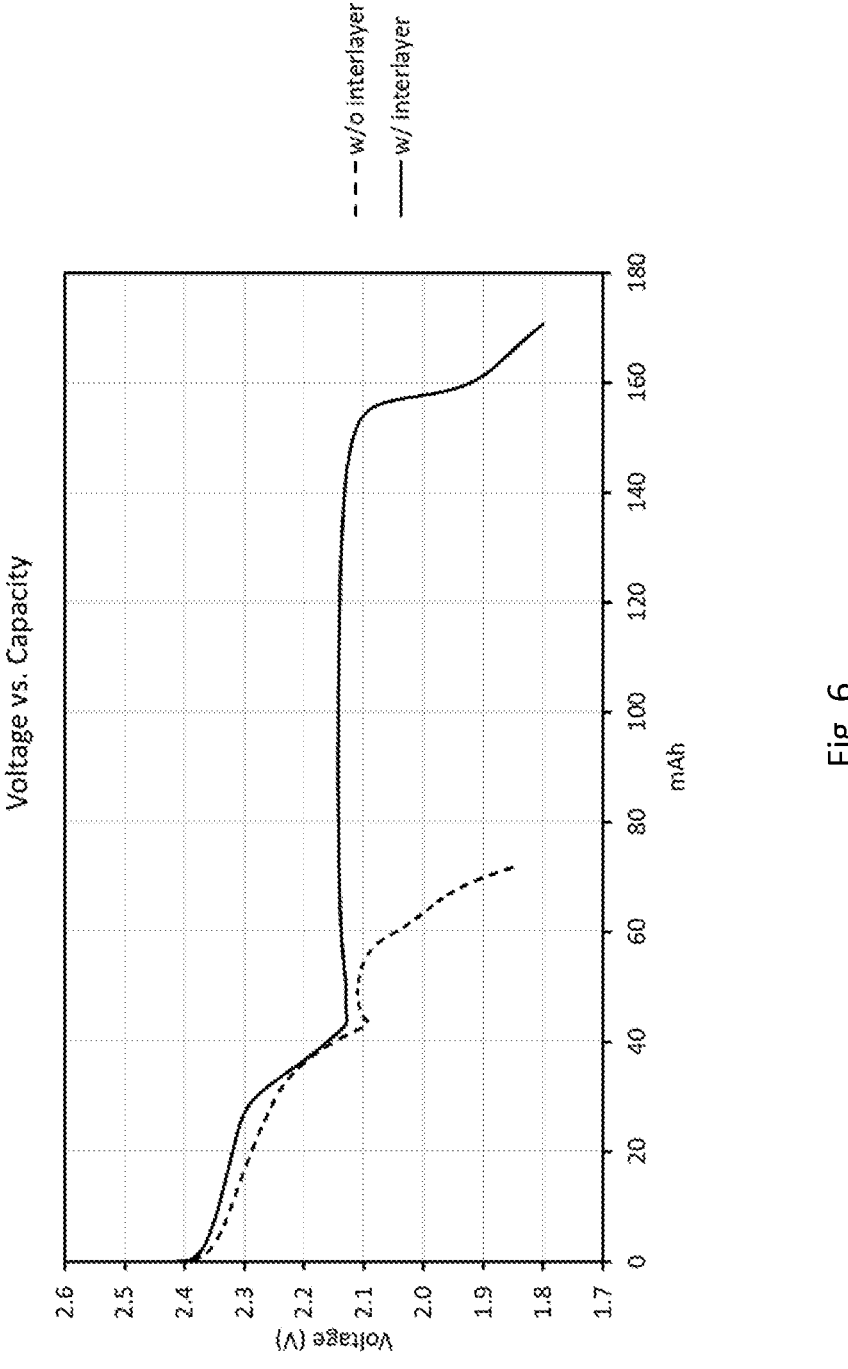
FIG. 6 is a graph illustrating the improved performance of an exemplary embodiment of a battery cell of the present disclosure compared to a traditional battery cell.
Figure 7:
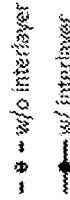
FIG. 7 is a graph illustrating improved performance of an exemplary embodiment of a battery cell of the present disclosure compared to a traditional battery cell.

In some exemplary embodiments, a separator can be configured as a permeable membrane that is positioned between the electrodes (e.g., an anode and a cathode) as shown in FIG. 5. The separator can be electrically insulative and can operate to keep the electrodes spaced apart, preventing physical contact between the electrodes, mitigating against an electrical short circuit in the battery. The separator may also be permeable to allow transport of ionic charge carriers therethrough (e.g., lithium ions), which complete an electrical circuit during a passage of current in the electrochemical cell. The separator, while flexible, can also provide adequate mechanical strength (e.g., high through-plane puncture resistance and in-plane tensile strength), dimensional stability, and resistance to thermal shrinkage. The separator can utilize any suitable material, including but not limited to cotton, nylon, polyesters, glass, polyethylene, polypropylene, poly(tetrafluoroethylene), polyvinyl chloride, ceramics, rubber, asbestos, or wood. As shown in FIGS. 6-7, the interlayer can provide a boost in increased performance in a battery cell, including but not limited to electronic conductivity while also increasing sulfur utilization.

Figure 2:
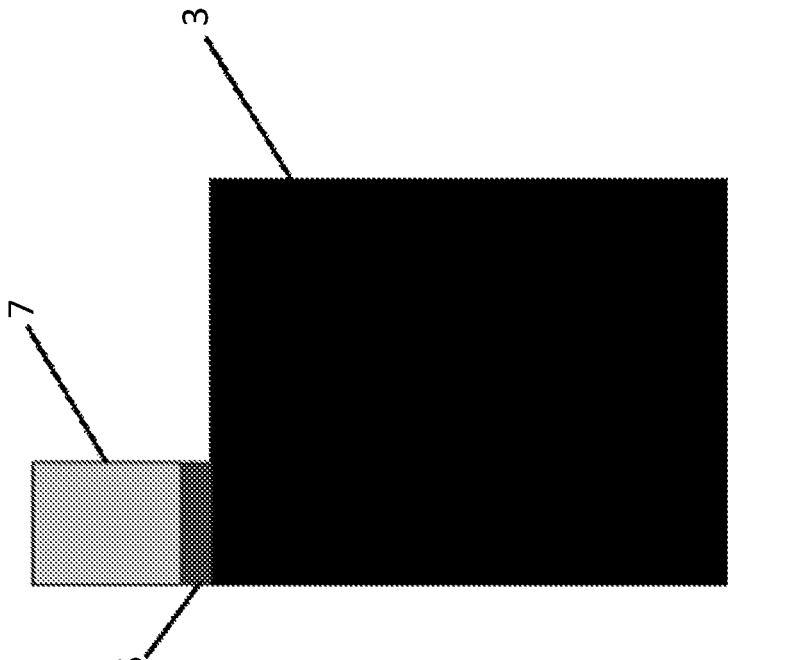
FIG. 2 is a top view of an exemplary embodiment of a carbon interlayer of the present disclosure.

As shown in FIG. 1 and FIG. 2, an exemplary embodiment of the present disclosure can include a cathode 3 having an interlayer 5 and a current collector 7. The cathode 3 can be composed of any suitable material including, but not limited to a pure carbon composition, sulfur composition, graphene composition, or other suitable materials on combinations thereof. In some exemplary embodiments, the cathode is composed of a sulfur-graphene composite material. A current collector can be composed of any suitable material, such as a metal or other electrically conductive material. In some exemplary embodiments, the current collector can be a carbon-coated aluminum current collector. Similarly, the interlayer can be composed of any suitable material, including but not limited to carbon nanotubes.

In one exemplary embodiment, the interlayer can be formed by using oxidized CNTs which can be synthesized via heat treating between about 20-60 nm diameter CNTs at about 500-600° C. for about 3-5 hours with a flow of air at between about 0.1-1 SCCM. Heat treatment can be done in a quartz tube furnace. In some exemplary embodiments, the interlayers can be polarized, porous hosts for sulfur deposition. Similarly, the interlayer 5 can be bonded to a current collector via Van der Walls (VdW) forces/interactions without the requirement of an additional binder. In other exemplary embodiments, a binder may be utilized to aid in coupling the interlayer to the current collector 7. In embodiments containing binders, the binder can include styrene butadiene copolymer (SBR), and polyvinylidene fluoride (PVDF).

In one exemplary embodiment, the interlayer can be composed of Ox-CNTs. Additionally, in some exemplary embodiments, the Ox-CNTs can be mixed with pristine CNTs at a preferred weight percent ration between about 1:99 to about 99:1 (Ox-CNT:CNT). In one exemplary embodiment, the preferred weight percent ratio can be about 20:80 (Ox-CNT:CNT). Typically, in some embodiments, the range of weight percentages of Ox-CNTs is about 1-30%. Higher Ox-CNTs content can provide high catalytic effects with a loss of electronic conductivity. Beyond 30 wt. % Ox-CNTs, bonding can become poor and adhesion to the current collector can become poor. At about 1-30 wt. % Ox-CNTs, the interlayer can be casted at any thickness without cracking or delamination, even without a binder. A zero-polymer binder can be used in an exemplary embodiment of the present invention. In some exemplary embodiments, CNTs can be between about 50-200 nm in length, and about 20-60 nm in diameter. Additionally, Ox-CNTs can be about 10-200 nm in length and highly disordered due to oxygen etching.

In some exemplary embodiments, binderless interlayers can be mixed and cast under very specific conditions in order for high adhesion and zero cracking to occur. Propylene glycol (PG) can be used as the solvent due to its high viscosity, safety, and non-toxicity. The high viscosity of the PG can be essential for keeping CNTs from agglomerating and for keeping the CNTs suspended even under storage conditions. The carbon concentration in the slurry can be about 20 g/L at room temperature. The concentration can range from about 18-22 g/L however with similar results.

As a result of CNTs high agglomeration propensity, the CNTs can be sheared apart using a high-shear mixer such as a homogenizer. An interlayer slurry can be homogenized at about 3500 rpm for about 30 minutes. Slurries can be stirred at low speed after this to maintain suspension of CNTs, but simple low speed stirring may not provide enough shear to separate CNTs from one another. Improper dispersion of CNTs can lead to agglomeration, poor adhesion, and cracking.

Figure 3:
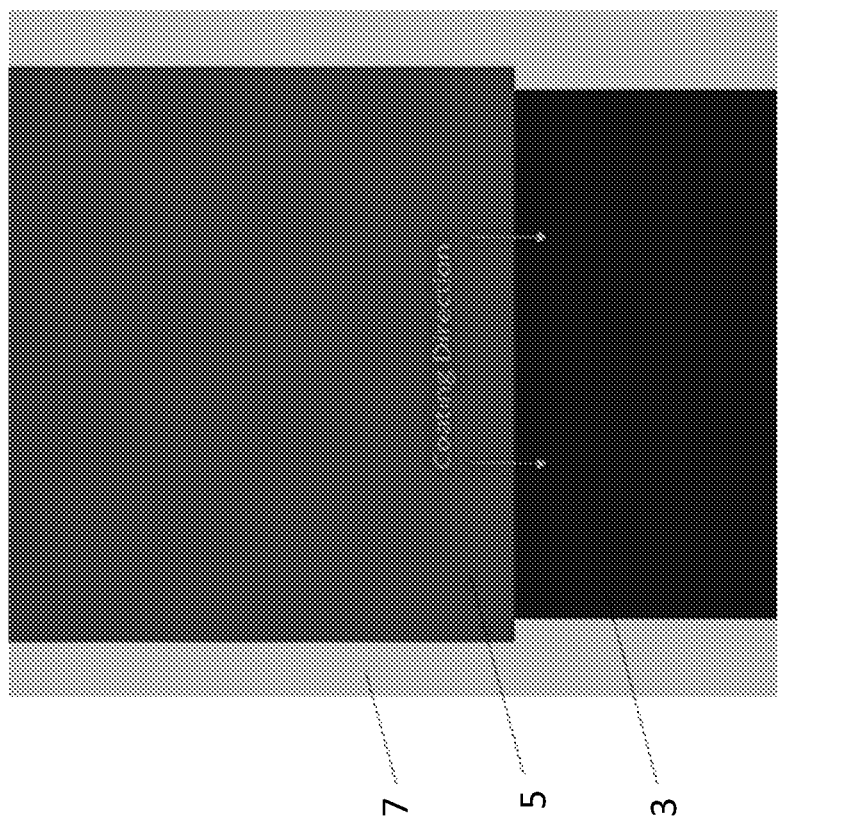
FIG. 3 is an illustration of an exemplary embodiments of a binderless carbon interlayer coating process of the present disclosure.

Interlayer loadings on typical cathodes range from about 0.1 mg/cm2 to about 1 mg/cm2 and can depend upon the sulfur loading of the underlying cathode. The interlayer coating can be coated about 1-2 mm wider than the cathode coating such that the interlayer can come into direct contact with the carbon-coated aluminum current collector and form a strong bond. FIG. 3 illustrates an exemplary embodiment of the coating process. The cathode 3 can be coated with the interlayer 5 in a first direction. In one exemplary embodiment, carbon coated aluminum foil can be used for its ability to form a very strong bond to a binderless interlayer. In other embodiments, pristine aluminum foil may not be preferred due to the weak bond formed between Al and the interlayer. In some exemplary embodiments, an interlayer can be cast at about 20-40° C., but preferably at about 30° C. Interlayer coated cathodes can then be dried at 70° C. via natural convection. Cathodes can then be dried for about 12 hours at about 65° C. under vacuum.

Figures 4A, 4B, 4C:
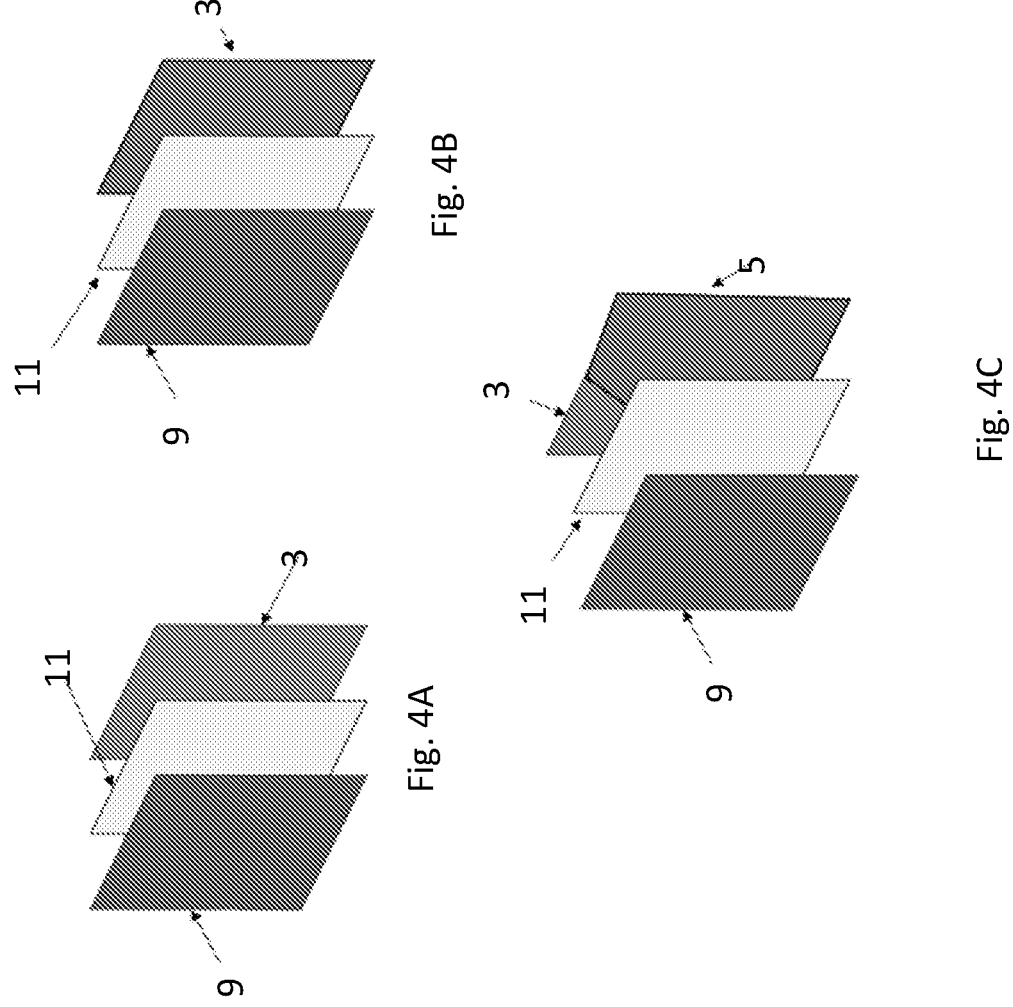
FIG. 4A is an illustration of how an exemplary embodiment of a single cell Lithium Sulfur Cell construction.
FIG. 4B is an illustration of how an exemplary embodiment of a single supercapacitor construction.
FIG. 4C is an illustration of how an exemplary embodiment of a hybrid sulfur cell construction.

FIGS. 4A-C provide various exemplary configurations of a battery. As shown in FIG. 4A traditional battery cells can include an anode 9 with a separator 11 between the anode and the cathode 3. Additionally, as illustrated in FIG. 4B, a supercapacitor cell can include an anode 9 and a cathode 3, wherein the cathode is comprised of carbon nanotubes and additionally has a separator 11 positioned between the anode 9 and the cathode 3. In one exemplary embodiment of the present disclosure, a battery cell can include an anode 9, cathode 3, and a separator, wherein the separator 11 is positioned between the anode 9 and cathode 9. Additionally, the cathode can include an interlayer 3.

As shown in FIG. 5, an exemplary embodiment of the present disclosure can include a battery cell 1 having one or more anodes 9 and one or more cathodes 3, wherein the cathodes are electrically connected and the anodes are electrically connected in parallel or series. One or more separators 11 can surround the anodes 9. Additionally, one or more of the cathodes 3 can include an interlayer 5 around the cathode structure. Each individual electrode can additionally include a current collector 7, which can be comprised of any suitable material, such as a metal or other conductive material. In one exemplary embodiment, the current collector can be comprised of carbon-coated aluminum. The cathode can be comprised of any suitable material, including but not limited to sulfur, cobalt, nickel, graphene, or other metals and composites thereof. One exemplary embodiment, of the present invention can include a cathode comprised of a graphene/sulfur composite. Similarly, in some exemplary embodiments, the anode can be comprised of lithium or a lithium oxide material. In some embodiments, the cathode can be comprised of a graphene/sulfur material. Furthermore, the interlayer surrounding the cathode can be comprised of carbon nanotubes. In some exemplary embodiments, the interlayer can include a mixture of pristine and oxidized carbon nanotubes at a ratio between about 20:80 (Ox-CNT:CNT to about 80:20 (Ox-CNT:CNT).

The present disclosure further provides a means for creating a percolating network throughout a sulfur active material with the use of graphene or other suitable carbon material. The sulfur active materials can be deposited onto various suitable carbon substrates, including but not limited to graphene substrates with high electrical conductivity and surface area or CNTs or other high capacitance carbon having high surface area and high electrical conductivity. The use of these various carbon substrates along with sulfur reduces the electrode overpotential for charging at lower voltages as well as increasing charging efficiency. Additionally, increased sulfur utilization is achieved by modifying the electrode microstructure to have uniformly distributed sulfur active materials onto a carbon active surface area.

In some exemplary embodiments, the cathode can be comprised of one or more kinds of carbon materials, including a first carbon material such as conductive carbon black or graphene nano-platelets, and a second carbon material such as activated carbon or carbon-nanotubes, having capacitor capacity and/or pseudo capacitor capacity, with or without a binder. Such carbon electrodes can include a porous carbon percolating network, (e.g. a nano-graphene percolating network, or equivalent carbon network) formed with or without the use of a binder. In some exemplary embodiments, the one or more of the electrodes can include a sulfur active material filled in the pores or deposited on the electrode active surface area therein, such material contributing to the energy content of the cell. Additionally, formed on the surface of the electrode thereof, a coating layer (interlayer) made of a porous carbon with high surface area (e.g. a carbon-nanotubes interlayer), with such layer contributing to the power content of the cell. Similarly, the interlayer can be composed or one or more kinds of carbon material such as pristine carbon nanotubes and oxidized carbon nanotubes. Other porous carbon compositions can be similarly used to for the interlayer composition.

Additionally, in some exemplary embodiments, a cathode of the present disclosure can be a pure carbon, zero binder, roll-to-roll processable cathode structure. The present disclosure provides a structure and method that results in a high conductivity (ionic and electrical), binder-free, and lightweight carbon cathode structures. The cathode structures can be primarily used in a battery cell construction and further optionally include an interlayer.

In some exemplary embodiments, the carbon component of the pure carbon binderless cathode can include but is not limited to carbon nanotubes, carbon nanofibers, Ketjen black, acetylene black, which can be dispersed in an organic solvent, including but not limited to propylene glycol and using high shear force mixing. The shear force mixing can create a stable carbon dispersion with dimensions of between about 8 nm-50 nm in diameter and about 10-200 um in length. In some exemplary embodiments, propylene glycol can be used at a ratio of 10-30 g of carbon material per 0.5-1.5 liters of propylene glycol. In one exemplary embodiment, the ration can be 20 grams of carbon material per 1 liter of propylene glycol.

The produced carbon dispersion can then be coated onto a conductive material/substrate, including but not limited to carbon coated aluminum foil, copper foil, woven metal mesh, expanded metal mesh, aluminum foam, perforated foil, and other suitable conductive non-solid metal substrates. The carbon dispersion can be applied using any suitable method, including, but not limited to the doctor blade method. The carbon loading on the conductive material can be at a density of about 0.1-5 mg/cm2. In some exemplary embodiments, carbon cathode can then be spooled up to a bending radius between about 1 mm to 1 cm depending upon the carbon loading density. In one exemplary embodiment, the carbon loading will be about 5 mg/cm2 and have a bending radius of about 1 cm due largely to the flexibility of the cathode structure. The cathode structure can then be dried using any suitable method at about 60-150° C., but typically about 60-80° C., and in one exemplary embodiment at about 70° C. under forced dry air. In one exemplary embodiment, no binder is used herein, with only 100% conductive material comprising the cathode structure.

Figures 8A, 8B, 8C, 8D:
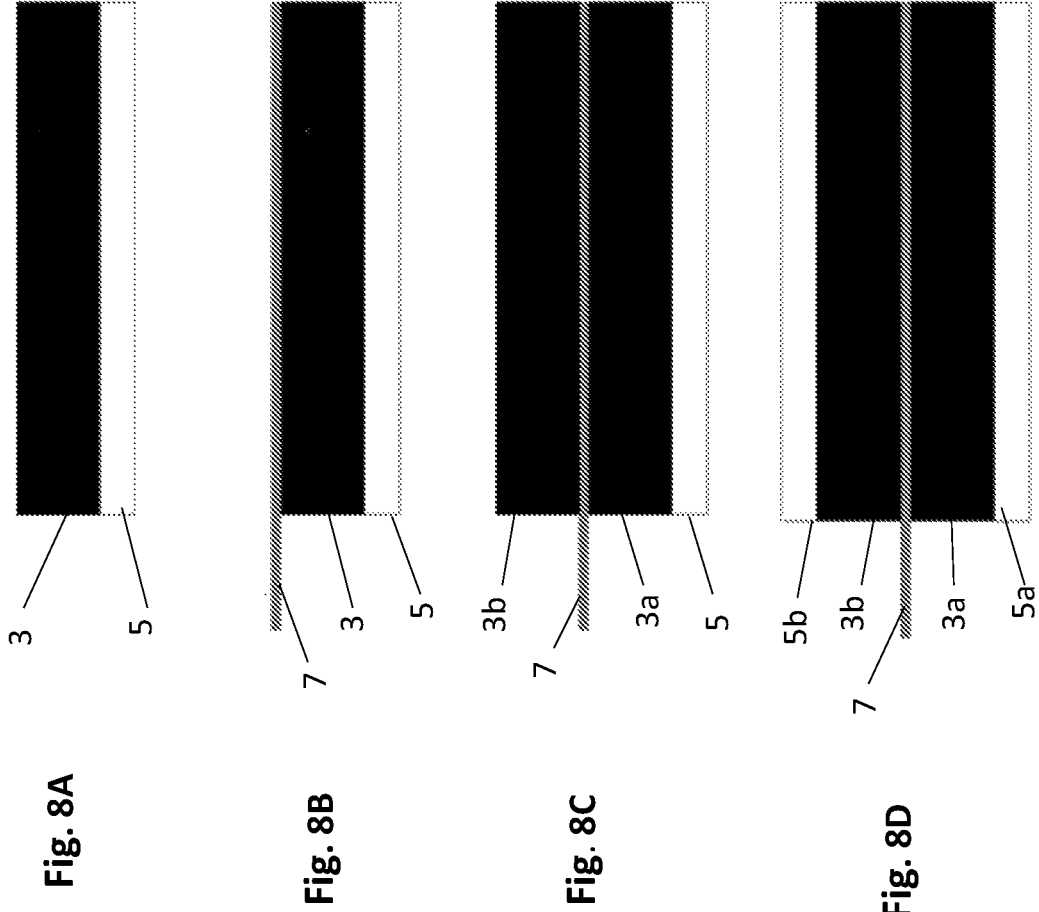
FIG. 8A is an illustration of an exemplary embodiment of a binderless carbon cathode including a separator during the first step of fabricating the cathode structure.
FIG. 8B is an illustration of an exemplary embodiment of a binderless carbon cathode including a separator during the second step of fabricating the cathode structure.
FIG. 8C of an exemplary embodiment of a binderless carbon cathode including a separator during the third step of fabricating the cathode structure.
FIG. 8D is an illustration of an exemplary embodiment of a binderless carbon cathode including a separator during the fourth step of fabricating the cathode structure.
Figure 9:
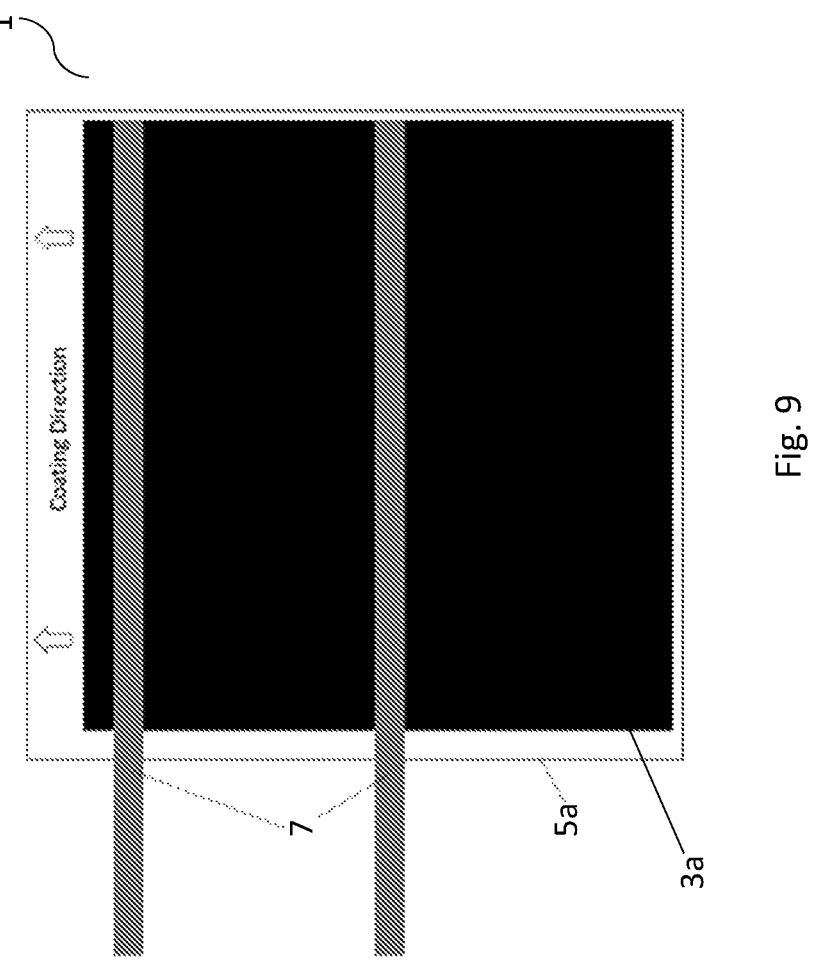
FIG. 9 is a top view illustration of an exemplary embodiment of a binderless carbon cathode including a separator during the second step of fabricating the cathode structure.
Figure 10:
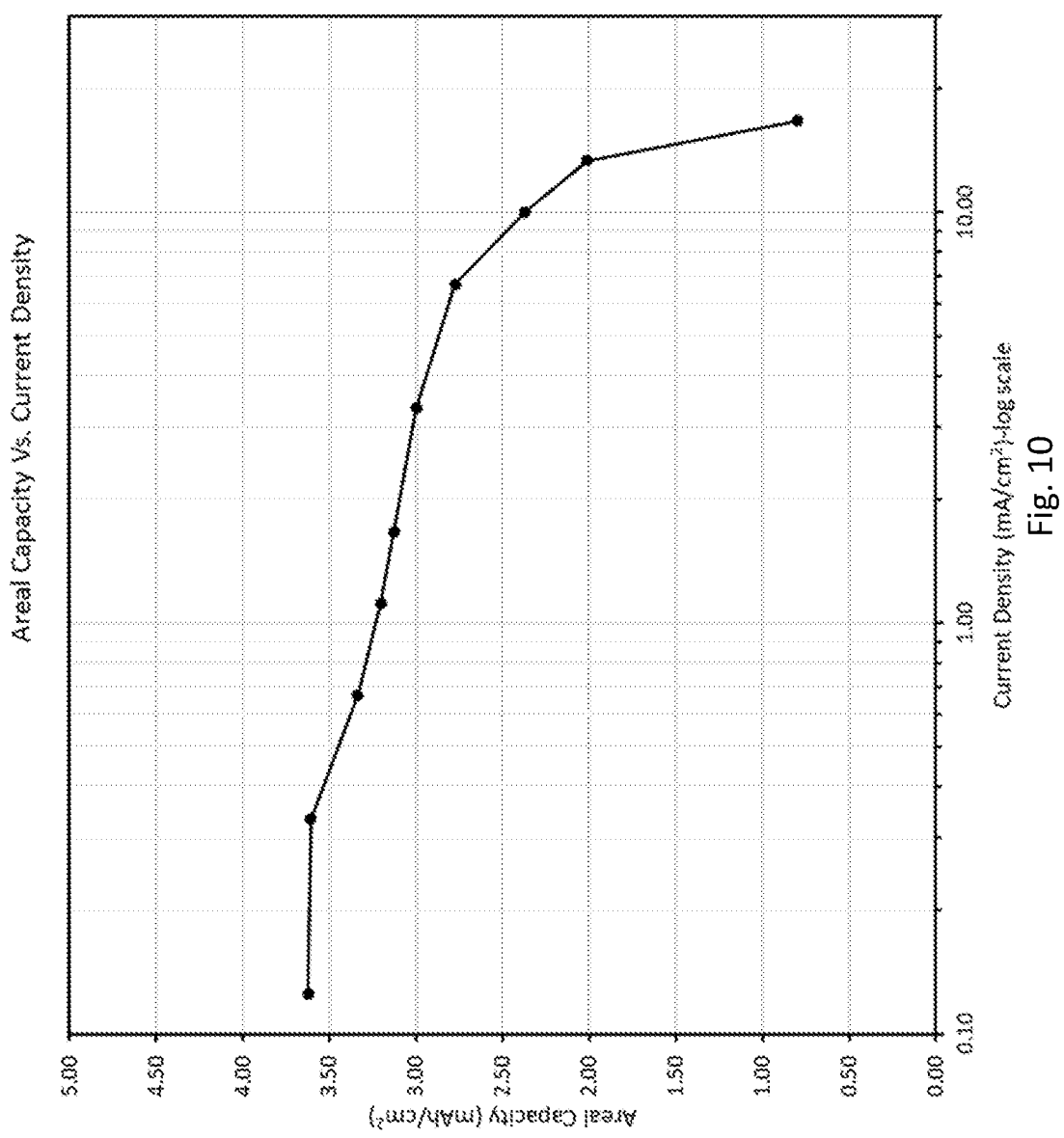
FIG. 10 is a graph illustrating the current density of a battery cell utilizing a pure binderless carbon cathode of the present disclosure.

In another exemplary embodiment, the carbon dispersion 13 can also be coated directly onto a separator 5, such as a polypropylene separator and used with or without conventional metal current collectors 7, as illustrated in FIG. 8A. The carbon dispersion can be coated onto polypropylene separator 11a and a conductive foil strips 7, including but not limited to aluminum or copper foil, and can be inlaid intermittently across the width of the cathode 3 as shown in FIG. 8B. A second coat of carbon dispersion 13b can be applied to the cathode 3 as shown in FIG. 8C. Additionally, a second separator 11b can be applied to the top of the wet carbon dispersion 3b as shown in FIG. 8D. As shown in FIG. 9, the cathode structure can be produced in a first coating direction.

Figure 11:
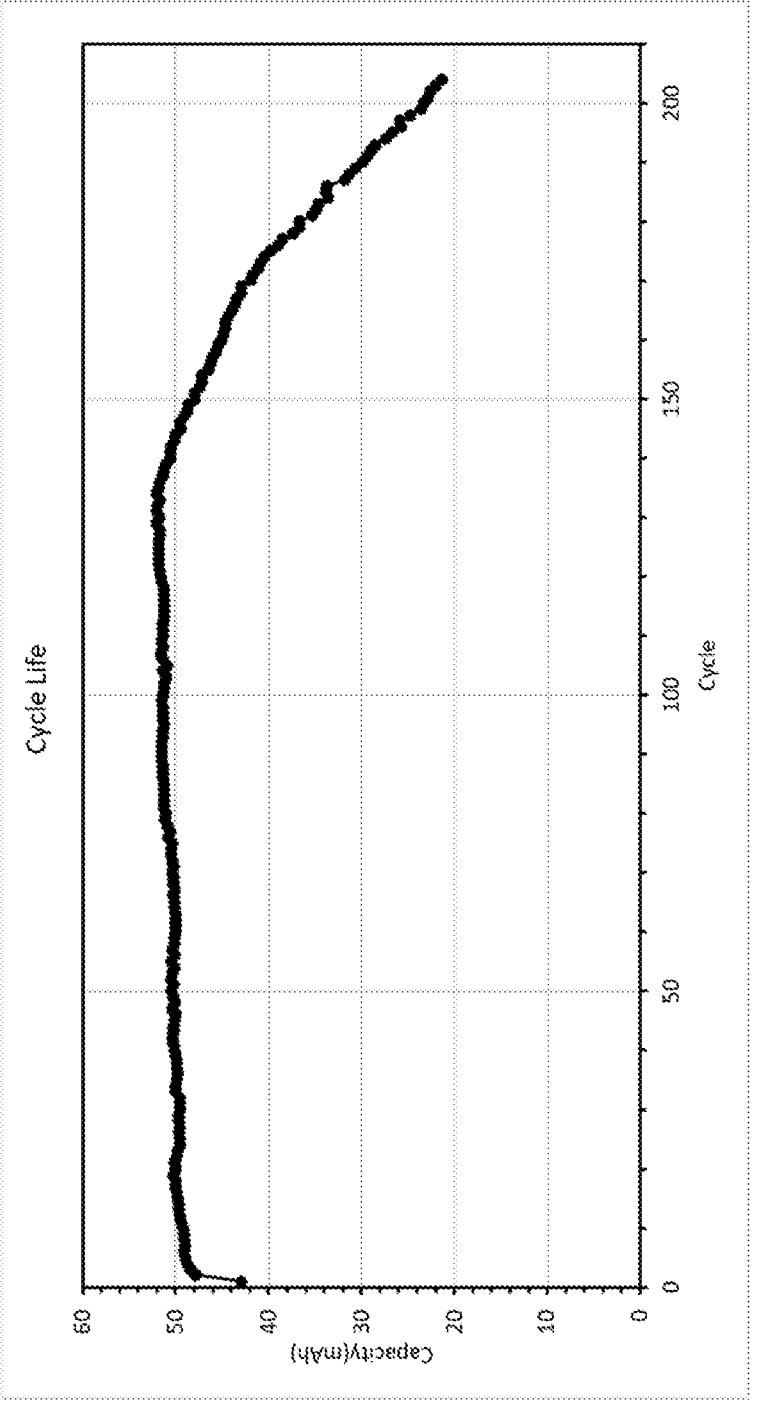
FIG. 11 is a graph illustrating the cycle life of a battery cell utilizing a pure binderless carbon cathode of the present disclosure.

In some exemplary embodiments, a sulfur active material can be introduced into the carbon cathode in any suitable way. In one exemplary embodiment, sulfur active material is introduced by soaking the cathode in polysulfide solution comprising dimethoxyethane (DME) and a polysulfide species, including but not limited to $Li_2S_4$, $Li_2S_5$, $Li_2S_6$, $Li_2S_7$, $Li_2S_8$, $Li_2S_9$. In some embodiments, $Li_2S_6$ can be the primary sulfur active material. In some exemplary embodiments, the polysulfide electrolyte solution is between 0.5-2 molar of a polysulfide solution, including but not limited to a lithium polysulfide solution such as $Li_2S_6$. Furthermore, some embodiments can utilize an ether-based electrolyte solution. The electrolyte solution can be an ether based polysulfide solution of between 0.5-2M concentration and result in the battery cell with the pure carbon cathode of the present disclosure have a greater than 400 Wh/kg in a cell format or similarly greater than >400 Wh/L in a cell format. FIGS. 11-12 provide graphical illustrations of the improved performance of battery cells utilizing the pure carbon binderless cathode structure of the previously presented production process.

In another exemplary embodiment, the sulfur active material can be introduced using a polysulfide-rich electrolyte at cell assembly to introduce sulfur active material uniformly into the cathode. Sulfur can be introduced using a suitable polysulfide species, including but not limited to $Li_2S_4$, $Li_2S_5$, $Li_2S_6$, $Li_2S_7$, $Li_2S_8$, $Li_2S_9$. In some embodiments, $Li_2S_6$ can be the primary sulfur active material.

Figure 12B:
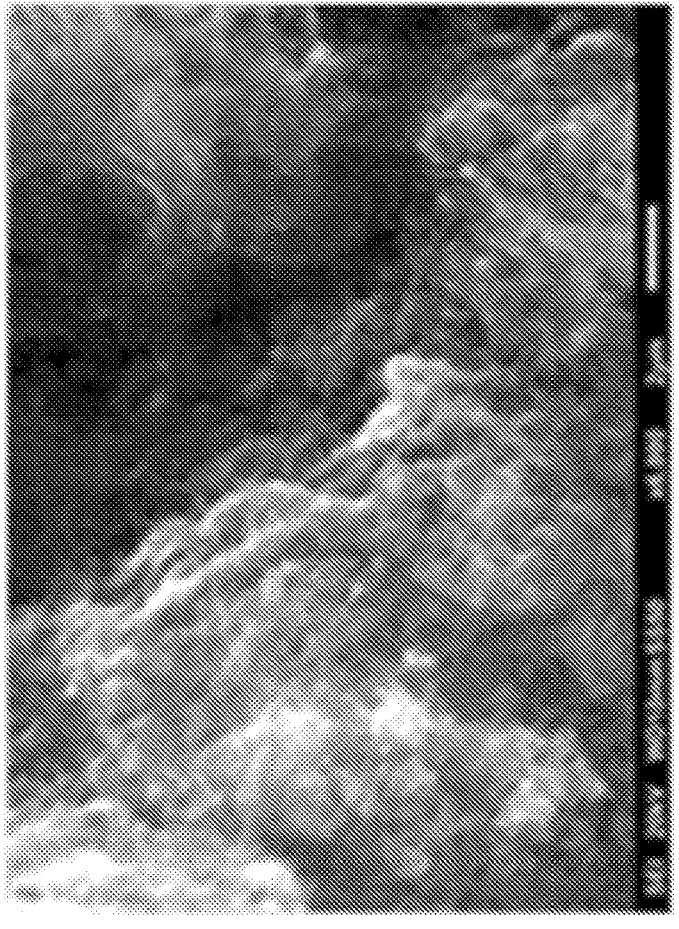
FIG. 12B is a top view of exemplary embodiment a full carbon electrode of the present disclosure with enhanced microstructure and high surface area.
Figure 12A:
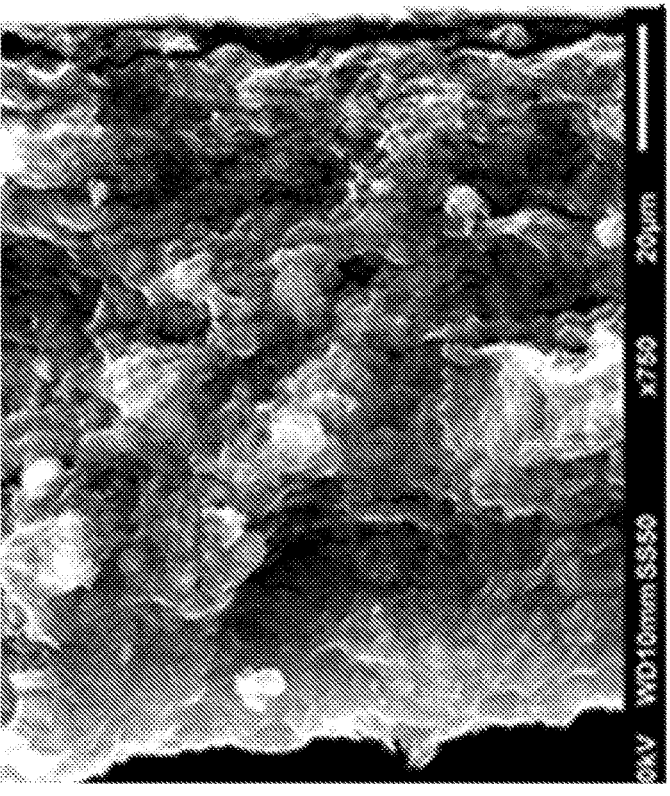
FIG. 12A is a cross-section view of exemplary embodiment a full carbon electrode of the present disclosure with enhanced microstructure and high surface area.

Additionally, the present disclosure provides a self-standing ribbon of cathode without binder. The cathode can be configured to have a very conductivity microstructure from the method of manufacturing the cathode. This microstructure may similar be created in other methods result in enhanced battery cell performance greater than 400 Wh/L or 400 Wh/kg. FIGS. 12A-B illustrate an exemplary microstructure of a pure carbon electrode of the present disclosure wherein the electrode has an increased surface area and desired features for utilization as a high energy density cathode electrode.

In some exemplary embodiments, a battery cell of the present disclosure can include a pure binderless carbon cathode formed by coating a substrate with a carbon dispersion at a density of about 0.1-5 mg/cm2. In some exemplary embodiments, the carbon dispersion can be coated onto polypropylene separator 11a and one or more conductive foil strips 7. The battery cell can further include an anode, such as a lithium anode and an electrolyte solution. The battery cell can optionally include an interlayer. In some exemplary embodiments, the interlayer can be comprised of a first carbon source and a second carbon source. The first carbon source can include oxidized nanotube and the second carbon source can include pristine nanotubes. The interlayer can include Ox-CNTs at about 1-30% weight of the interlayer composition. Additionally, the electrolyte solution can be a used to introduce a sulfur active material is introduced by soaking the cathode in polysulfide electrolyte solution comprising dimethoxyethane (DME) and a polysulfide species, including but not limited to $Li_2S_4$, $Li_2S_5$, $Li_2S_6$, $Li_2S_7$, $Li_2S_8$, $Li_2S_9$. In some embodiments, $Li_2S_6$ can be the primary sulfur active material. In some exemplary embodiments, the polysulfide electrolyte solution is between 0.5-2 molar of a polysulfide solution, including but not limited to a lithium polysulfide solution such as $Li_2S_6$. In some embodiments, the resulting battery cell can achieve performance greater than 400 Wh/kg and/or greater than >400 WhL.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A battery cell comprising:

an anode, wherein the anode is comprised of lithium;

a carbon-based cathode, wherein the cathode is comprised of a first carbon material, a second carbon material, and sulfur component, wherein pure binderless carbon is introduced to a sulfur active material to the carbon-based cathode by soaking the cathode in polysulfide electrolyte solution comprising dimethoxyethane (DME) and a polysulfide species selected from at least one of the following: $Li_2S_4$, $Li_2S_5$, $Li_2S_6$, $Li_2S_7$, $Li_2S_8$, $Li_2S_9$, wherein the interlayer is comprised of oxidized carbon nanotubes and pristine carbon nanotubes;

an interlayer coated around an exterior surface of the cathode, wherein the interlayer is comprised of oxidized carbon nanotubes and pristine carbon nanotubes and is configured to act as a secondary pathway to a current collector; and a separator positioned between the anode and the cathode, wherein the separator is selected from at least one of the following: cotton, nylon, polyesters, glass, polyethylene, polypropylene, poly(tetrafluoroethylene), polyvinyl chloride, ceramics, rubber, asbestos, or wood.

2. The battery cell of claim 1, wherein the interlayer is disposed on the cathode utilizing atomic layer disposition.

3. The battery cell of claim 1, wherein the interlayer comprises between 1-30% by weight of oxidized carbon nanotubes.

4. The battery cell of claim 1, wherein the ratio of oxidized carbon nanotubes to pristine carbon nanotubes is 20:80 by weight.

* * * * *